US011481877B2

(12) United States Patent
Okunev et al.

(10) Patent No.: US 11,481,877 B2
(45) Date of Patent: Oct. 25, 2022

(54) ENHANCING THE RESOLUTION OF A VIDEO STREAM

(71) Applicant: Meta Platforms Technologies, LLC, Menlo Park, CA (US)

(72) Inventors: Mikhail Okunev, Redmond, WA (US); Anton S. Kaplanyan, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 160 days.

(21) Appl. No.: 16/903,263

(22) Filed: Jun. 16, 2020

(65) Prior Publication Data

US 2021/0390661 A1    Dec. 16, 2021

(51) Int. Cl.
*G06T 3/40* (2006.01)
*G06N 20/00* (2019.01)
*G06T 3/00* (2006.01)

(52) U.S. Cl.
CPC ............ *G06T 3/4076* (2013.01); *G06N 20/00* (2019.01); *G06T 3/0093* (2013.01); *G06T 3/4007* (2013.01)

(58) Field of Classification Search
CPC ... G06T 3/4076; G06T 3/0093; G06T 3/4007; G06T 3/4046; G06T 2207/20081; G06T 5/00; G06T 3/4053; G06N 20/00
See application file for complete search history.

(56) References Cited

U.S. PATENT DOCUMENTS

2019/0206026 A1*   7/2019   Vemulapalli .......... G06T 3/4053
2020/0126191 A1*   4/2020   Munkberg ................ G06T 7/50

OTHER PUBLICATIONS

Bao W., et al., "MEMC-Net: Motion Estimation and Motion Compensation Driven Neural Network for Video Interpolation and Enhancement," IEEE Transactions on Pattern Analysis and machine Intelligence, arXiv:1810.08768v2 [cs.CV], Sep. 5, 2019, 16 pages.
Hayat K., et al., "Multimedia Super-Resolution via Deep Learning: A Survey," Digital Signal Processing. Academic Press, vol. 81, Jul. 26, 2018, pp. 198-217.

(Continued)

*Primary Examiner* — Chan S Park
*Assistant Examiner* — Daniel C Chang
(74) *Attorney, Agent, or Firm* — Baker Botts L.L.P.

(57) ABSTRACT

In one embodiment, a method includes accessing first-resolution images corresponding to frames of a video, computing a motion vector based on a first-resolution image of a first frame in the video and a first-resolution image of a second frame in the video, generating a second-resolution warped image associated with the second frame by using the motion vector to warp a second-resolution reconstructed image associated with the first frame, generating a second-resolution intermediate image associated with the second frame based on the first-resolution image associated with the second frame, computing adjustment parameters by processing the first-resolution image associated with the second frame and the second-resolution warped image associated with the second frame using a machine-learning model, and adjusting pixels of the second-resolution intermediate image associated with the second frame based on the adjustment parameters to reconstruct a second-resolution reconstructed image associated with the second frame.

20 Claims, 8 Drawing Sheets

(56) References Cited

OTHER PUBLICATIONS

International Search report and Written Opinion for International Application No. PCT/US2021/032653, dated Sep. 16, 2021, 13 pages.

Wang L., et al., "Learning for Video Super-Resolution through HR Optical Flow Estimation," arxiv.org, Cornell University Library, 201 Olin LibraryCornell University Ithaca, NY 14853, Sep. 23, 2018, pp. 4321-4330.

Zhang H., et al., "Two-Stream Oriented Video Super-Resolution for Action Recognition," arxiv.org, Cornell University Library, 201 Olin LibraryCornell University Ithaca, NY 14853, Mar. 13, 2019, pp. 8799-8808.

\* cited by examiner

ENHANCING THE RESOLUTION OF A VIDEO STREAM

TECHNICAL FIELD

This disclosure generally relates to image processing, and in particular relates to enhancing a resolution of a video stream.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a computing device may process images at a lower resolution and up-sample the images to a higher resolution using a machine-learning model. The costs of rendering images and transferring the rendered images may depend on the resolution of the rendered images. To reduce such costs, the computing device may process images at a lower resolution and increasing resolutions of the images using a machine-learning model before displaying the images to a user. The computing device may access first-resolution images corresponding to frames of a video. The computing device may compute a first motion vector based on a first-resolution image of a first frame in the video and a first-resolution image of a second frame in the video, where the first frame comes before the second frame in the video. The computing device may generate a second-resolution warped image associated with the second frame by using the first motion vector to warp a second-resolution reconstructed image associated with the first frame, where a second resolution may be higher than a first resolution. The second-resolution warped image associated with the second frame may comprise objects located at predicted locations based on the computed motion vector. The computing device may generate a second-resolution intermediate image associated with the second frame based on the first-resolution image associated with the second frame. To generate the second-resolution intermediate image associated with the second frame, the computing device may uniformly place pixels of the first-resolution image associated with the second frame into a second-resolution image plane for the second-resolution intermediate image such that a plurality of pixels left blank. The computing device may fill the plurality of blank pixels in the second-resolution image plane with interpolated values of non-blank neighboring pixels. The computing device may compute adjustment parameters by processing the first-resolution image associated with the second frame and the second-resolution warped image associated with the second frame using a machine-learning model. The computing device may adjust pixels of the second-resolution intermediate image associated with the second frame based on the adjustment parameters to reconstruct a second-resolution reconstructed image associated with the second frame.

In particular embodiments, the machine-learning model may be trained. The training may be performed by another computing device. During a training process of the machine-learning model, trainable variables of the machine-learning model may be adjusted to compute adjustment parameters that minimize pre-determined loss functions. The trainable variables may comprise weights and biases within the machine-learning model. The computing device may measure differences between the second-resolution reconstructed image associated with the second frame and a second-resolution ground truth image associated with the second frame. The computing device may compute gradients of the trainable variables of the machine-learning model based on the measured differences between the second-resolution reconstructed image associated with the second frame and the second-resolution ground truth image associated with the second frame. The computing device may update the trainable variables by a gradient-descent back-propagation procedure. In particular embodiments, the computing device may measure differences between selected pixels in a second-resolution warped image associated with a third frame and the selected pixels in a second-resolution ground truth image associated with the third frame, where the second frame may locate before the third frame in the frame sequence of the video. To generate the second-resolution warped image associated with the third frame, the computing device may compute a second motion vector based on the second-resolution ground truth image associated with the second frame and the second-resolution ground truth image associated with the third frame. Then, the computing device may generate the second-resolution warped image associated with the third frame by using the second motion vector to warp the second-resolution reconstructed image associated with the second frame. The selected pixels may be identified as pixels with strong optical flow correspondence by comparing pixels in the second-resolution ground truth image associated with the second frame and the second-resolution ground truth image associated with the third frame. The computing device may compute gradients of trainable variables of the machine-learning model based on the measured differences between the selected pixels in the second-resolution warped image associated with the third frame and the selected pixels in the second-resolution ground truth image associated with the third frame. The computing device may update the trainable variables are updated by a gradient-descent backpropagation procedure. The computing device may train the machine-learning model with either of the computed gradients or with both of the computed gradients.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
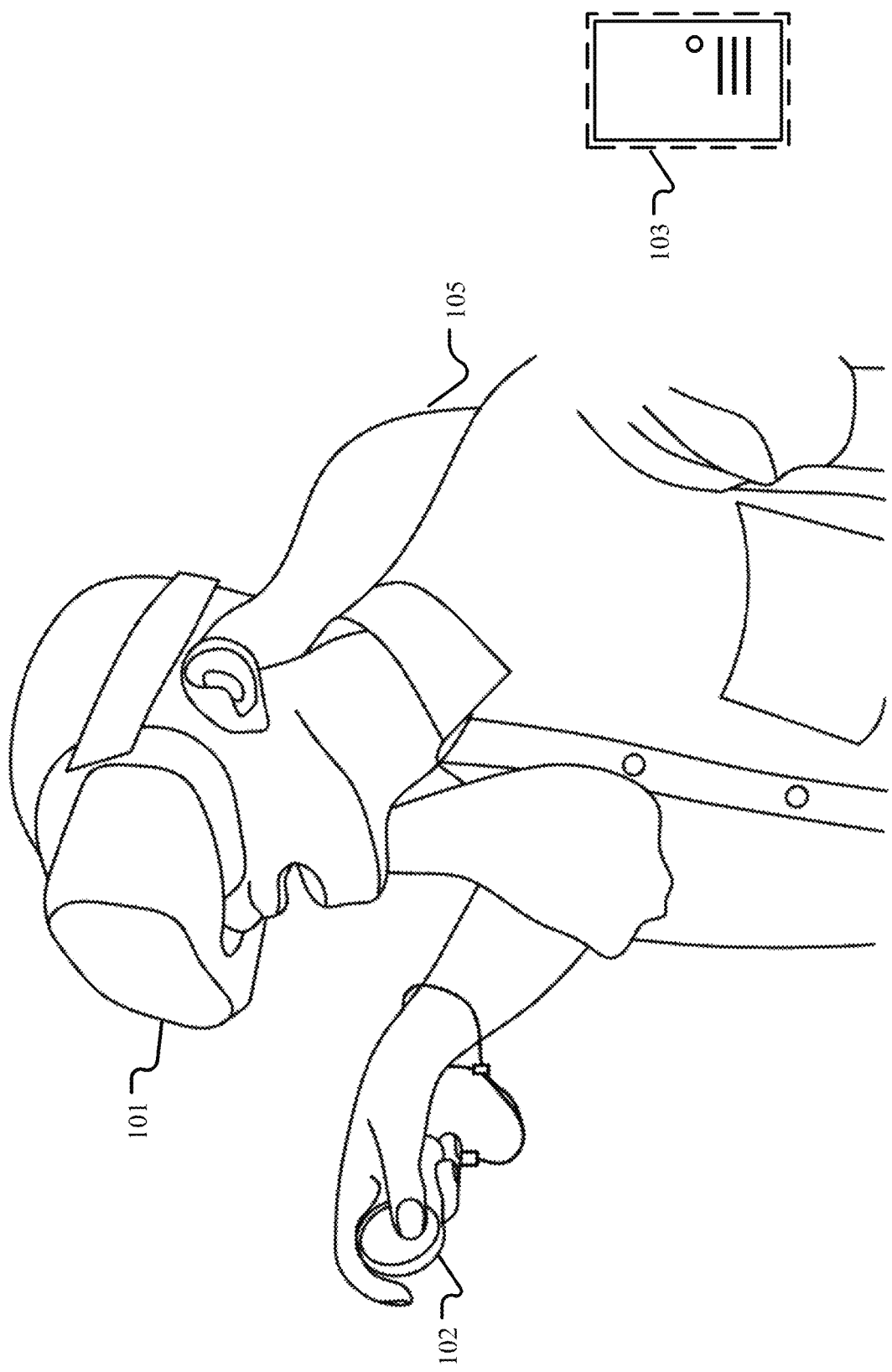
FIG. 1 illustrates an example artificial reality system.

FIG. 1 illustrates an example artificial reality system. Artificial reality is a form of reality that has been adjusted in some manner before presentation to a user 105, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The example artificial reality system illustrated in FIG. 1 may comprise a head-mounted display (HMD) 101, a controller 102, and a computing device 103. A user 105 may wear a head-mounted display (HMD) 101 that may provide visual artificial reality content to the user 105. The HMD 101 may include an audio device that may provide audio artificial reality content to the user 105. A controller 102 may comprise a trackpad and one or more buttons. The controller 102 may receive input from the user 105 and relay the input to the computing device 103. The controller 102 may also provide haptic feedback to the user 105. The computing device 103 may be connected to the HMD 101 and the controller 102. The computing device 103 may control the HMD 101 and the controller 102 to provide the artificial reality content to the user and receive input from the user 105. The computing device 103 may be a standalone host computer system, combined with the HMD 101, a mobile device, or any other hardware platform capable of providing artificial reality content to one or more users 105 and receive input from the users 105.

In particular embodiments, the computing device 103 may receive a video stream from a third-party device and present the received video stream to the user 105 through the HMD 101. The required bandwidth for traffic from the third-party device to the computing device 103 may be dependent on the resolution of the video stream. If the communication path between the third-party device and the computing device 103 comprises a wireless link, the available bandwidth may be limited. If the computing device 103 is capable of enhancing the resolution of the video stream with a reasonable computing cost, the computing device 103 may be able to reduce the cost associated with the network bandwidth by receiving the video stream at a lower resolution and enhancing the resolution of the video before displaying the video to the user. Furthermore, rendering images of a high resolution may be expensive. If a cost associated with rendering high-resolution images for a video is larger than a combined cost associated with rendering low-resolution images for the video and enhancing the resolution of the images using a machine-learning model, the computing device 103 may reduce the cost by rendering the images at a low resolution and enhancing the resolution of the images using a machine-learning model. Disclosed herein is a way to process images at a lower resolution and up-sample the images to a higher resolution using a machine-learning model.

In particular embodiments, the computing device 103 may process images at a lower resolution and up-sample the images to a higher resolution using a machine-learning model. The costs of rendering images and transferring the rendered images may depend on the resolution of the rendered images. To reduce such costs, the computing device 103 may process images at a lower resolution and increasing resolutions of the images using a machine-learning model before displaying the images to a user. The computing device 103 may access first-resolution images corresponding to frames of a video. The computing device 103 may compute a first motion vector based on a first-resolution image of a first frame in the video and a first-resolution image of a second frame in the video, where the first frame comes before the second frame in the video. The computing device 103 may generate a second-resolution warped image associated with the second frame by using the first motion vector to warp a second-resolution reconstructed image associated with the first frame, where a second resolution may be higher than a first resolution. The second-resolution warped image associated with the second frame may comprise objects located at predicted locations based on the computed motion vector. The computing device 103 may generate a second-resolution intermediate image associated with the second frame based on the first-resolution image associated with the second frame. To generate the second-resolution intermediate image associated with the second frame, the computing device 103 may uniformly place pixels of the first-resolution image associated with the second frame into a second-resolution image plane for the second-resolution intermediate image such that a plurality of pixels left blank. The computing device 103 may fill the plurality of blank pixels in the second-resolution image plane with interpolated values of non-blank neighboring pixels. The computing device 103 may compute adjustment parameters by processing the first-resolution image associated with the second frame and the second-resolution warped image associated with the second frame using a machine-learning model. The computing device 103 may adjust pixels of the second-resolution intermediate image associated with the second frame based on the adjustment parameters to reconstruct a second-resolution reconstructed image associated with the second frame. Although this disclosure describes generating a second-resolution reconstructed image using a machine-learning model in a particular manner, this disclosure contemplates generating a second-resolution reconstructed image using a machine-learning model in any suitable manner.

Figure 2:
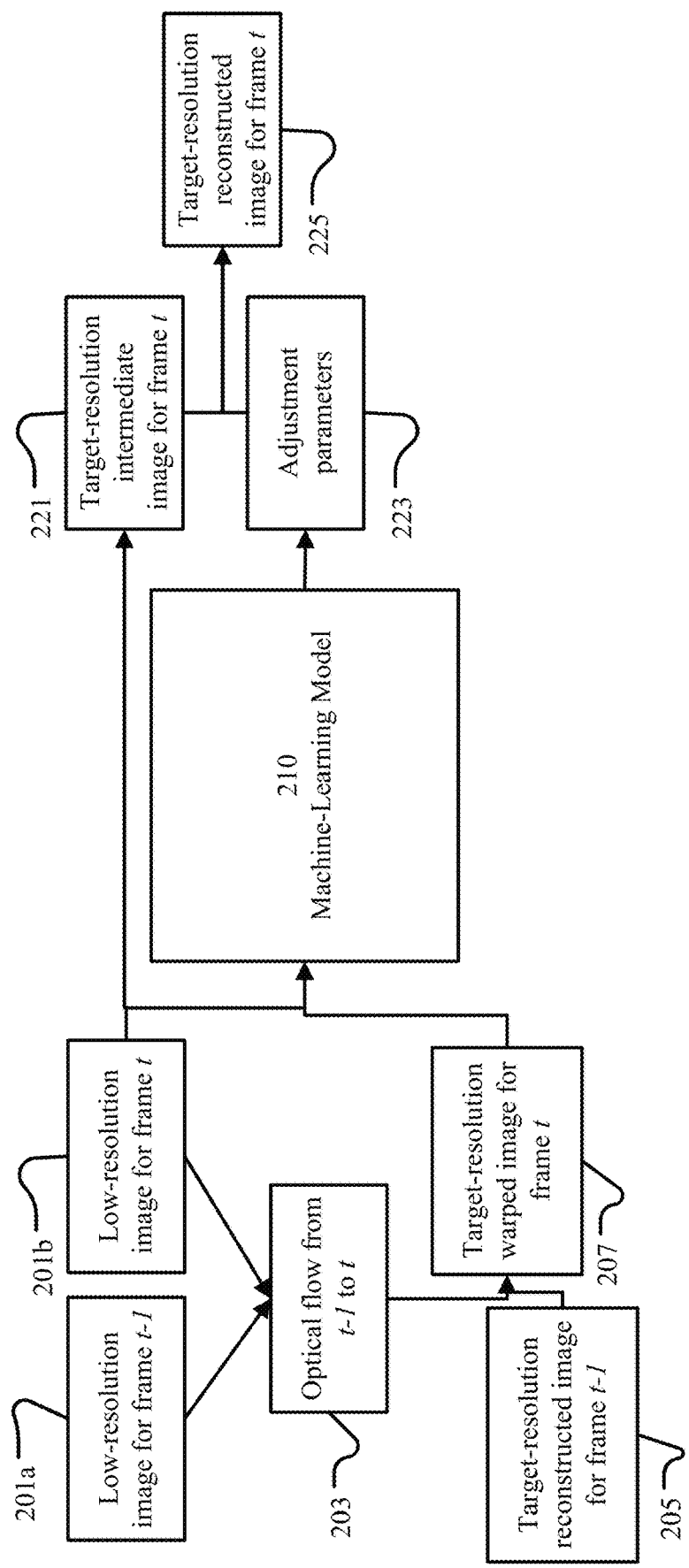
FIG. 2 illustrates an example process for enhancing a resolution of an image of a video using a machine-learning model.

In particular embodiments, the computing device 103 may access first-resolution images corresponding to frames of a video. The computing device 103 may compute a first motion vector based on a first-resolution image of a first frame in the video and a first-resolution image of a second frame in the video, where the first frame comes before the second frame in the video. FIG. 2 illustrates an example process for enhancing a resolution of an image of a video using a machine-learning model. As an example and not by way of limitation, illustrated in FIG. 2, a computing device 103 may access a video stream of an original resolution. The computing device 103 may present the video stream to an associated user at a target resolution, where the target resolution is higher than the original resolution. To present the video stream to the associated user at the target resolution, the computing device 103 may enhance the resolution of the video stream using a machine-learning model 210. In particular embodiments, the computing device 103 may be combined with the HMD 101. The computing device 103 may receive the video stream from a third-party device. In particular embodiments, the third-party device may be a hand-held device. The communication link from the third-party device to the computing device 103 may be wireless. In particular embodiments, the video stream may comprise artificial-reality objects. In the example illustrated in FIG. 2, the computing device 103 is enhancing a resolution of an image corresponding to frame t of the video stream. The computing device 103 may access an original-resolution image corresponding to frame t−1 201a and an original-resolution image corresponding to frame t 201b. The computing device 103 may compute a motion vector based on the original-resolution image corresponding to frame t−1 201a and the original-resolution image corresponding to frame t 201b. In particular embodiments, the motion vector may be an optical flow 203. The optical flow may be a pattern of apparent motion of objects, surfaces, and edges in a visual scene. Although this disclosure describes computing a motion vector based on images corresponding to consecutive frames of a video stream in a particular manner, this disclosure contemplates computing a motion vector based on images corresponding to consecutive frames of a video stream in any suitable manner.

In particular embodiments, the computing device 103 may generate a second-resolution warped image associated with the second frame by using the first motion vector to warp a second-resolution reconstructed image associated with the first frame. A second resolution may be higher than a first resolution. The second-resolution warped image associated with the second frame may comprise objects located at predicted locations based on the computed motion vector. As an example and not by way of limitation, continuing with a prior example, illustrated in FIG. 2, the computing device 103 may access a target-resolution reconstructed image corresponding to frame t−1 205. The target-resolution reconstructed image corresponding to frame t−1 205 may have been generated at a process of enhancing the resolution of image corresponding to frame t−1. The computing device 103 may generate a target-resolution warped image corresponding to frame t 207 by using the computed optical flow 203 from frame t−1 to frame t to warp the target-resolution reconstructed image corresponding to frame t−1 205. The target-resolution warped image corresponding to frame t 207 may comprise objects shown in the target-resolution reconstructed image corresponding to frame t−1 205 that are located at predicted locations. The predicted locations for the objects may be determined based on the computed optical flow 203 from frame t−1 to frame t. Although this disclosure describes generating a target-resolution warped image in a particular manner, this disclosure contemplates generating a target-resolution warped image in any suitable manner.

In particular embodiments, the computing device 103 may generate a second-resolution intermediate image associated with the second frame based on the first-resolution image associated with the second frame. As an example and not by way of limitation, continuing with a prior example, illustrated in FIG. 2, the computing device 103 may generate a target-resolution intermediate image corresponding to frame t 221 based on the original-resolution image corresponding to frame t 201b. In particular embodiments, the computing device 103 may use an interpolation-based up-sampling method to generate the target-resolution intermediate image corresponding to frame t 221. Although this disclosure describes generating a target-resolution intermediate image in a particular manner, this disclosure contemplates a target-resolution intermediate image in any suitable manner.

Figure 3:
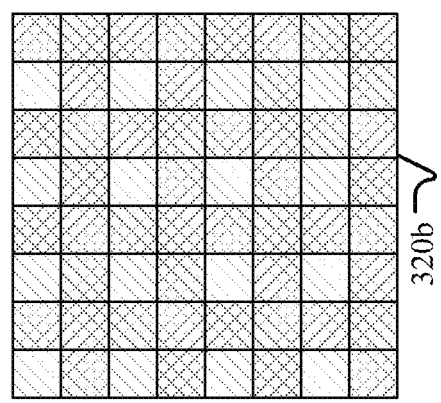
FIG. 3 illustrates an example process for generating a target-resolution intermediate image from an original-resolution image.
Figure 3:
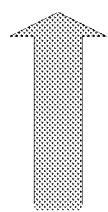
Figure 3:
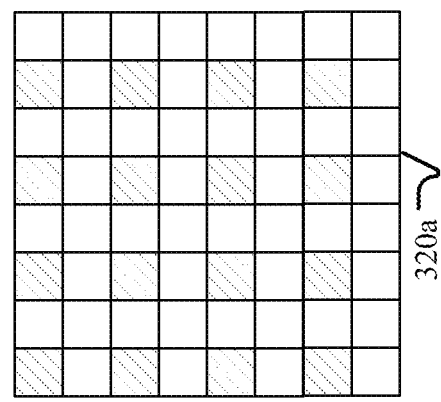
Figure 3:
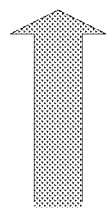
Figure 3:
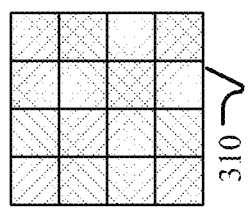

In particular embodiments, the computing device 103, to generate the second-resolution intermediate image associated with the second frame, may uniformly place pixels of the first-resolution image associated with the second frame into a second-resolution image plane for the second-resolution intermediate image such that a plurality of pixels left blank. The computing device 103 may fill the plurality of blank pixels in the second-resolution image plane with interpolated values of non-blank neighboring pixels. FIG. 3 illustrates an example process for generating a target-resolution intermediate image from an original-resolution image. As an example and not by way of limitation, illustrated in FIG. 3, the computing device 103 may access an original-resolution image 310. To generate a target-resolution intermediate image, the computing device 310 prepare a target-resolution image plane 320, where the target resolution is higher than the original resolution. The target-resolution image plane may be a memory space associated with the computing device 103. Then, the computing device 103 may uniformly place pixels of the original-resolution image 310 into the target-resolution image plane 320a such that the target-resolution image plane 320a at this stage may comprise a plurality of blank pixels. The computing device 103 may fill the plurality of blank pixels with interpolated values of non-blank neighboring pixels to generate the target-resolution intermediate image 320b. The computing device 103 may use a nearest-neighbor interpolation, a bi-linear interpolation, a bi-cubic interpolation or any suitable interpolation technique to fill the plurality of blank pixels. Although this disclosure describes generating a target-resolution intermediate image by an interpolation in a particular manner, this disclosure contemplates generating a target-resolution intermediate image by an interpolation in any suitable manner.

In particular embodiments, the computing device 103 may compute adjustment parameters by processing the first-resolution image associated with the second frame and the second-resolution warped image associated with the second frame using a machine-learning model. In particular embodiments, the machine-learning model may be a Convolutional Neural Network (CNN) model. In particular embodiments, the machine-learning model may be a Generative Adversarial Network (GAN) model. As an example and not by way of limitation, continuing with a prior example, illustrated in FIG. 2, the computing device 103 may provide the original-resolution image corresponding to frame t 201b and the target-resolution warped image corresponding to frame t 207 to a machine-learning model 210. The machine-learning model 210 may produce adjustments parameters 223. In particular embodiments, the machine-learning model 210 may be executed on the computing device 103. In particular embodiments, the machine-learning model 210 may be executed on a third-party device. Although this disclosure describes computing adjustment parameters using a machine-learning model in a particular manner, this disclosure contemplates computing adjustment parameters using a machine-learning model in any suitable manner.

In particular embodiments, the computing device 103 may adjust pixels of the second-resolution intermediate image associated with the second frame based on the adjustment parameters to reconstruct a second-resolution reconstructed image associated with the second frame. As an example and not by way of limitation, continuing with a prior example, illustrated in FIG. 2, the computing device 103 may generate a target-resolution reconstructed image corresponding to frame t 225 by applying the computed adjustment parameters 223 to the target-resolution intermediate image corresponding to frame t 221. The computing device 103 may present the target-resolution reconstructed image corresponding to frame t 225 to the associated user. Although this disclosure describes generating a target-resolution reconstructed image based on a target-resolution intermediate image and computed adjustment parameters in a particular manner, this disclosure contemplates generating a target-resolution reconstructed image based on a target-resolution intermediate image and computed adjustment parameters in any suitable manner.

In particular embodiments, the machine-learning model may be trained. During a training process of the machine-learning model, trainable variables of the machine-learning model may be adjusted to compute adjustment parameters that minimize pre-determined loss functions. The trainable variables may comprise weights and biases within the machine-learning model. As an example and not by way of limitation, a computing device may train the machine-learning model with collected training data. The training data may comprise original-resolution video streams and corresponding target-resolution video streams. The computing device may compute a loss based on differences between the target-resolution reconstructed images and the corresponding target-resolution ground truth images. The computing device may compute gradients for the trainable variables of the machine-learning model based on the loss. The computing device may update the trainable variable by a gradient-descent backpropagation procedure. The computing device may repeat the process until an objective of the training is achieved. Although this disclosure describes training a machine-learning model in a particular manner, this disclosure contemplates training a machine-learning model in any suitable manner.

Figure 4A:
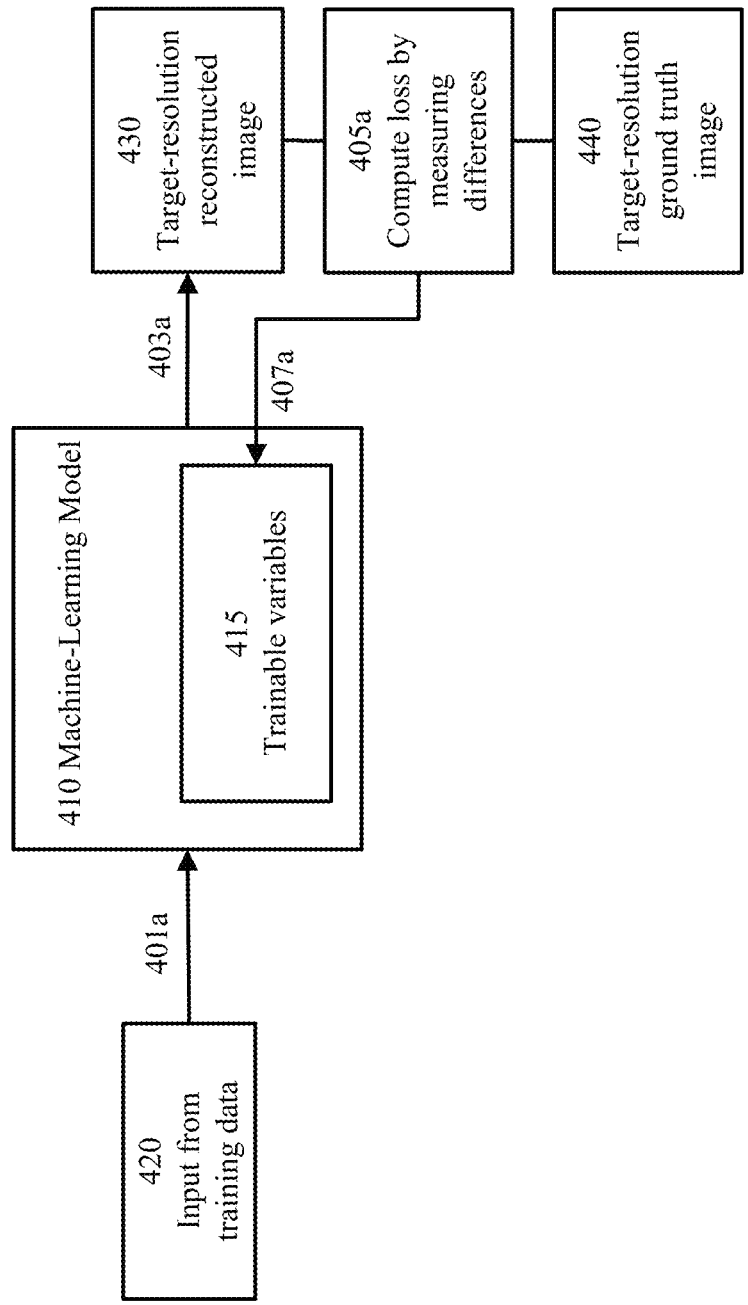
FIG. 4A illustrates an example machine-learning model training with a loss function based on measured differences between the reconstructed image and its corresponding ground truth image.

In particular embodiments, the computing device may measure differences between the second-resolution reconstructed image associated with the second frame and a second-resolution ground truth image associated with the second frame. FIG. 4A illustrates an example machine-learning model training with a loss function based on measured differences between the reconstructed image and its corresponding ground truth image. As an example and not by way of limitation, illustrated in FIG. 4A, a set of training data may be prepared, where the set of training data may comprise original-resolution video streams and their corresponding target-resolution video streams. At step 401a, the computing device may provide input 420 to the machine-learning model 410. The machine-learning model 410 may comprise training variables 415. The input 420 may comprise an original-resolution image and a target-resolution warped image. The input 420 may be prepared as illustrated in FIG. 2. At step 403a, a target-resolution reconstructed image 430 may be generated. Though the details are omitted in FIG. 4A for brevity purpose, the computing device may generate the target-resolution reconstructed image 430 by adjusting pixels of a target-resolution intermediate image based on adjustment parameters from the machine-learning model 410. At step 405a, the computing device may compute a loss by measuring differences between the target-resolution reconstructed image 430 and a corresponding target-resolution ground-truth image 440. The loss may be computed based on a pre-determined loss function. Although this disclosure describes computing a loss for training a machine-learning model in a particular manner, this disclosure contemplates computing a loss for training a machine-learning model in any suitable manner.

In particular embodiments, the computing device may compute gradients of the trainable variables of the machine-learning model based on the measured differences between the second-resolution reconstructed image associated with the second frame and the second-resolution ground truth image associated with the second frame. The computing device may update the trainable variables by a gradient-descent backpropagation procedure. As an example and not by way of limitation, continuing with a prior example, illustrated in FIG. 4A, the computing device may compute gradients of the trainable variables 415 of the machine-learning model 410 based on the computed loss. The computing device, at step 407a, may update the trainable variables 415 by a gradient-descent backpropagation procedure. The computing device may continue the training by repeating the processes until a predetermined objective of the training is achieved. In particular embodiments, the predetermined objective of the training may be achieving the losses less than a predetermined threshold for a set of testing data. Although this disclosure describes updating trainable variables by a gradient-descent backpropagation in a particular manner, this disclosure contemplates updating trainable variables by a gradient-descent backpropagation in any suitable manner.

Figure 4B:
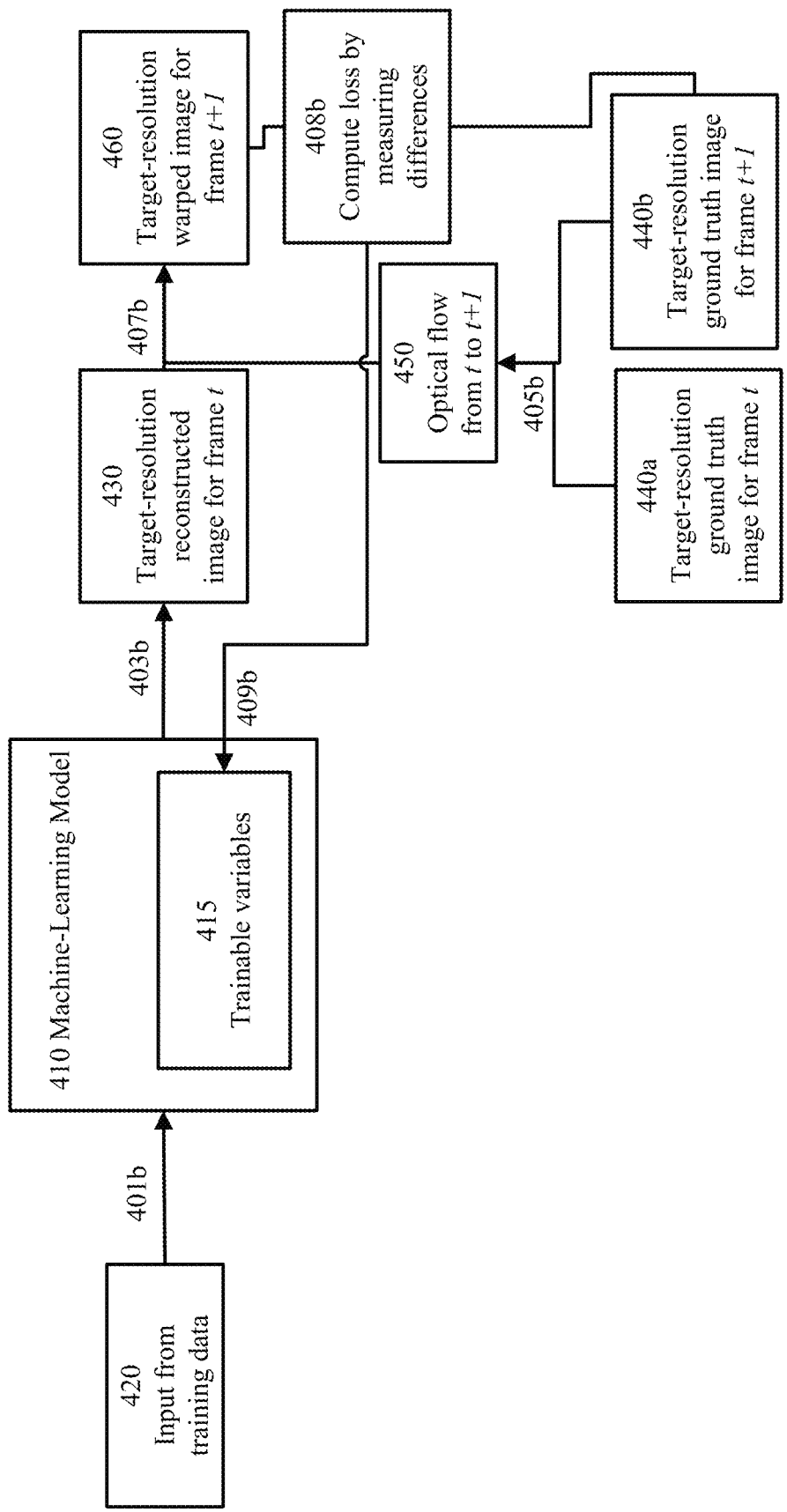
FIG. 4B illustrates an example machine-learning model training with a loss function based on measured differences between a warped image for a following frame and its corresponding ground truth image.

FIG. 4B illustrates an example machine-learning model training with a loss function based on measured differences between a second-resolution warped image for a following frame and its corresponding second-resolution ground truth image. In particular embodiments, the computing device may compute a loss based on the measured differences between a target-resolution warped image corresponding to a third frame and a target-resolution ground truth image corresponding to the third frame, where the third frame comes later than the second frame in the video stream. In particular embodiments, the computing device may compute gradients for the trainable variables 415 based on the computed loss. The computing device may update the trainable variables 415 by a gradient-descent backpropagation process with the computed gradients. As an example and not by way of limitation, illustrated in FIG. 4B, the computing device may prepare the input 420 as illustrated in FIG. 2. The input 420 may comprise an original-resolution image corresponding frame t and a target-resolution warped image corresponding to frame t. The computing device, at step 401b, may provide the prepared input 420 to the machine-learning model 410. At step 403b, the computing device may generate a target-resolution reconstructed image for frame t 430 by adjusting pixels of a target-resolution intermediate image corresponding to frame t based on adjustment parameters from the machine-learning model 410. In particular embodiments, the target-resolution reconstructed image corresponding to frame t 430 may be compared with a target-resolution ground truth image corresponding to frame t 440a as illustrated in FIG. 4A. In addition to that, or as an alternative of that, the computing device may generate a target-resolution warped image corresponding to frame t+1 460 and compare the target-resolution warped image corresponding to frame t+1 460 with a target-resolution ground truth image corresponding to frame t+1 440b. At step 405b, the computing device may compute optical flow from frame t to frame t+1 450 based on a target-resolution ground truth image corresponding to frame t 440a and the target-resolution ground truth image corresponding to frame t+1 440b. The computing device, at step 407b, may generate the target-resolution warped image corresponding to frame t+1 460 based on the target-resolution reconstructed image corresponding to frame t 430 and the computed optical flow from frame t to frame t+1 450. The computing device use the optical flow from frame t to frame t+1 450 to warp the target-resolution reconstructed image corresponding to frame t 430. The target-resolution warped image corresponding to frame t+1 460 may comprise objects located at predicted locations based on the computed optical flow 450. Although this disclosure describes generating a target-resolution warped image associated with a future frame in a particular manner, this disclosure contemplates generating a target-resolution warped image associated with a future frame in any suitable manner.

In particular embodiments, the computing device may measure differences between a second-resolution warped image associated with a third frame and a second-resolution ground truth image associated with the third frame, where the second frame may locate before the third frame in the frame sequence of the video. In particular embodiments, the computing device may measure differences between selected pixels in the second-resolution warped image associated with the third frame and the selected pixels in the second-resolution ground truth image associated with the third frame. In particular embodiments, the computing device may identify the selected pixels as pixels with strong optical flow correspondence by comparing pixels in the warped second-resolution ground truth image associated with the second frame and the warped second-resolution ground truth image associated with the third frame. As an example and not by way of limitation, continuing with a prior example, illustrated in FIG. 4B, the computing device, at step 408b, may compute a loss based on differences between the target-resolution warped image corresponding to frame t+1 460 and the target-resolution ground truth image corresponding to frame t+1 440b. The loss may be computed based on a pre-determined loss function. In particular embodiments, the loss may be computed based on differences between selected pixels in the target-resolution warped image corresponding to frame t+1 460 and the selected pixels in the target-resolution ground truth image corresponding to frame t+1 440b. The selected pixels may be identified as pixels with optical flow correspondence higher than a threshold. Although this disclosure describes computing a loss for training a machine-learning model in a particular manner, this disclosure contemplates computing a loss for training a machine-learning model in any suitable manner.

In particular embodiments, the computing device may compute gradients of trainable variables of the machine-learning model based on the measured differences between the selected pixels in the second-resolution warped image associated with the third frame and the selected pixels in the second-resolution ground truth image associated with the third frame. The computing device may update the trainable variables are updated by a gradient-descent backpropagation procedure. As an example and not by way of limitation, continuing with a prior example, illustrated in FIG. 4B, the computing device may compute gradients of the trainable variables 415 of the machine-learning model 410 based on the loss computed at step 408b. The computing device, at step 409b, may update the trainable variables 415 by a gradient-descent backpropagation procedure. The computing device may continue the training by repeating the processes until a predetermined objective of the training is achieved. Although this disclosure describes updating trainable variables by a gradient-descent backpropagation in a particular manner, this disclosure contemplates updating trainable variables by a gradient-descent backpropagation in any suitable manner.

Figure 5:
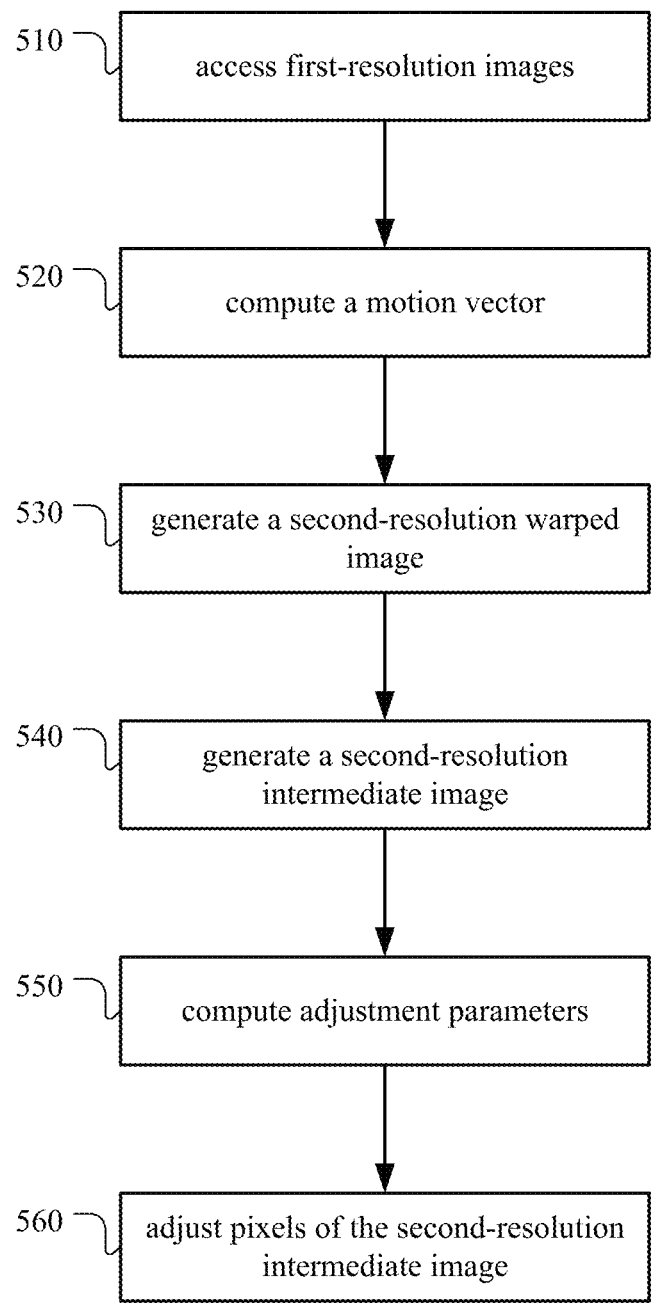
FIG. 5 illustrates an example method for enhancing the resolution of a video stream.

FIG. 5 illustrates an example method 500 for enhancing the resolution of a video stream. The method may begin at step 510, where the computing device may access first-resolution images corresponding to frames of a video. At step 520, the computing device may compute a motion vector based on a first-resolution image of a first frame in the video and a first-resolution image of a second frame in the video. At step 530, the computing device may generate a second-resolution warped image associated with the second frame by using the motion vector to warp a second-resolution reconstructed image associated with the first frame. At step 540, the computing device may generate a second-resolution intermediate image associated with the second frame based on the first-resolution image associated with the second frame. At step 550, the computing device may compute adjustment parameters by processing the first-resolution image associated with the second frame and the second-resolution warped image associated with the second frame using a machine-learning model. At step 560, the computing device may adjust pixels of the second-resolution intermediate image associated with the second frame based on the adjustment parameters to reconstruct a second-resolution reconstructed image associated with the second frame. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for enhancing the resolution of a video stream including the particular steps of the method of FIG. 5, this disclosure contemplates any suitable method for enhancing the resolution of a video stream including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
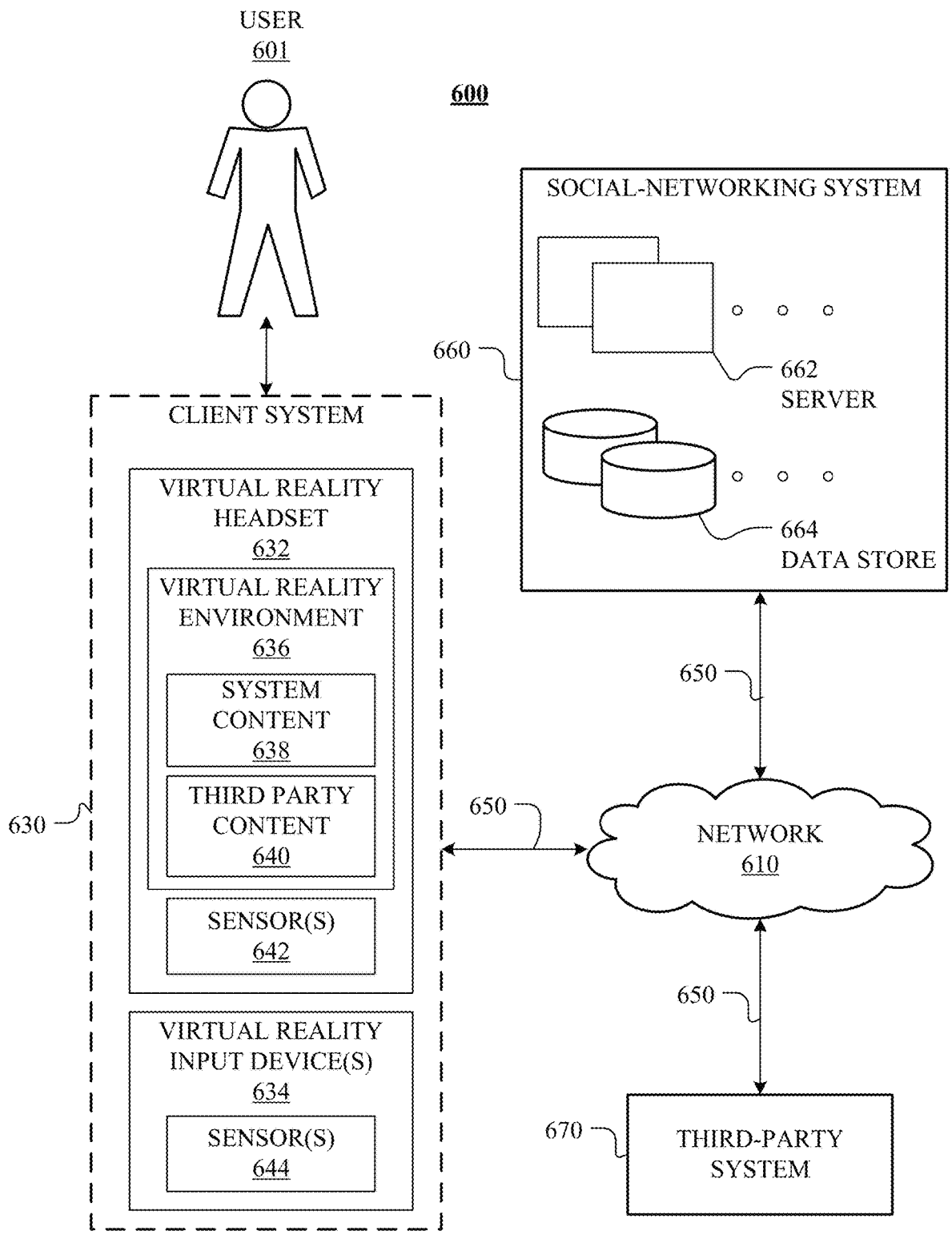
FIG. 6 illustrates an example network environment associated with a virtual reality system.

FIG. 6 illustrates an example network environment 600 associated with a virtual reality system. Network environment 600 includes a user 601 interacting with a client system 630, a social-networking system 660, and a third-party system 670 connected to each other by a network 610. Although FIG. 6 illustrates a particular arrangement of a user 601, a client system 630, a social-networking system 660, a third-party system 670, and a network 610, this disclosure contemplates any suitable arrangement of a user 601, a client system 630, a social-networking system 660, a third-party system 670, and a network 610. As an example and not by way of limitation, two or more of a user 601, a client system 630, a social-networking system 660, and a third-party system 670 may be connected to each other directly, bypassing a network 610. As another example, two or more of a client system 630, a social-networking system 660, and a third-party system 670 may be physically or logically co-located with each other in whole or in part. Moreover, although FIG. 6 illustrates a particular number of users 601, client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple users 601, client systems 630, social-networking systems 660, third-party systems 670, and networks 610.

This disclosure contemplates any suitable network 610. As an example and not by way of limitation, one or more portions of a network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 610 may include one or more networks 610.

Links 650 may connect a client system 630, a social-networking system 660, and a third-party system 670 to a communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout a network environment 600. One or more first links 650 may differ in one or more respects from one or more second links 650.

In particular embodiments, a client system 630 may be an electronic device including hardware, software, or embedded logic components or a combination of two or more such components and capable of carrying out the appropriate functionalities implemented or supported by a client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 630. A client system 630 may enable a network user at a client system 630 to access a network 610. A client system 630 may enable its user to communicate with other users at other client systems 630. A client system 630 may generate a virtual reality environment for a user to interact with content.

In particular embodiments, a client system 630 may include a virtual reality (or augmented reality) headset 632, such as OCULUS RIFT and the like, and virtual reality input device(s) 634, such as a virtual reality controller. A user at a client system 630 may wear the virtual reality headset 632 and use the virtual reality input device(s) to interact with a virtual reality environment 636 generated by the virtual reality headset 632. Although not shown, a client system 630 may also include a separate processing computer and/or any other component of a virtual reality system. A virtual reality headset 632 may generate a virtual reality environment 636, which may include system content 638 (including but not limited to the operating system), such as software or firmware updates and also include third-party content 640, such as content from applications or dynamically downloaded from the Internet (e.g., web page content). A virtual reality headset 632 may include sensor(s) 642, such as accelerometers, gyroscopes, magnetometers to generate sensor data that tracks the location of the headset device 632. The headset 632 may also include eye trackers for tracking the position of the user's eyes or their viewing directions. The client system may use data from the sensor(s) 642 to determine velocity, orientation, and gravitation forces with respect to the headset. Virtual reality input device(s) 634 may include sensor(s) 644, such as accelerometers, gyroscopes, magnetometers, and touch sensors to generate sensor data that tracks the location of the input device 634 and the positions of the user's fingers. The client system 630 may make use of outside-in tracking, in which a tracking camera (not shown) is placed external to the virtual reality headset 632 and within the line of sight of the virtual reality headset 632. In outside-in tracking, the tracking camera may track the location of the virtual reality headset 632 (e.g., by tracking one or more infrared LED markers on the virtual reality headset 632). Alternatively or additionally, the client system 630 may make use of inside-out tracking, in which a tracking camera (not shown) may be placed on or within the virtual reality headset 632 itself. In inside-out tracking, the tracking camera may capture images around it in the real world and may use the changing perspectives of the real world to determine its own position in space.

Third-party content 640 may include a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at a client system 630 may enter a Uniform Resource Locator (URL) or other address directing a web browser to a particular server (such as server 662, or a server associated with a third-party system 670), and the web browser may generate a Hyper Text Transfer Protocol (HTTP) request and communicate the HTTP request to server. The server may accept the HTTP request and communicate to a client system 630 one or more Hyper Text Markup Language (HTML) files responsive to the HTTP request. The client system 630 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 660 may be a network-addressable computing system that can host an online social network. The social-networking system 660 may generate, store, receive, and send social-networking data, such as, for example, user-profile data, concept-profile data, social-graph information, or other suitable data related to the online social network. The social-networking system 660 may be accessed by the other components of network environment 600 either directly or via a network 610. As an example and not by way of limitation, a client system 630 may access the social-networking system 660 using a web browser of a third-party content 640, or a native application associated with the social-networking system 660 (e.g., a mobile social-networking application, a messaging application, another suitable application, or any combination thereof) either directly or via a network 610. In particular embodiments, the social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, the social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, the social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. The social-networking system 660 may provide users of the online social network the ability to communicate and interact with other users. In particular embodiments, users may join the online social network via the social-networking system 660 and then add connections (e.g., relationships) to a number of other users of the social-networking system 660 whom they want to be connected to. Herein, the term "friend" may refer to any other user of the social-networking system 660 with whom a user has formed a connection, association, or relationship via the social-networking system 660.

In particular embodiments, the social-networking system 660 may provide users with the ability to take actions on various types of items or objects, supported by the social-networking system 660. As an example and not by way of limitation, the items and objects may include groups or social networks to which users of the social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 660 or by an external system of a third-party system 670, which is separate from the social-networking system 660 and coupled to the social-networking system 660 via a network 610.

In particular embodiments, the social-networking system 660 may be capable of linking a variety of entities. As an example and not by way of limitation, the social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating the social-networking system 660. In particular embodiments, however, the social-networking system 660 and third-party systems 670 may operate in conjunction with each other to provide social-networking services to users of the social-networking system 660 or third-party systems 670. In this sense, the social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 660 also includes user-generated content objects, which may enhance a user's interactions with the social-networking system 660. User-generated content may include anything a user can add, upload, send, or "post" to the social-networking system 660. As an example and not by way of limitation, a user communicates posts to the social-networking system 660 from a client system 630. Posts may include data such as status updates or other textual data, location information, photos, videos, links, music or other similar data or media. Content may also be added to the social-networking system 660 by a third-party through a "communication channel," such as a newsfeed or stream.

In particular embodiments, the social-networking system 660 may include a variety of servers, sub-systems, programs, modules, logs, and data stores. In particular embodiments, the social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 660 may also include suitable components such as network interfaces, security mechanisms, load balancers, failover servers, management-and-network-operations consoles, other suitable components, or any suitable combination thereof. In particular embodiments, the social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 660 to one or more client systems 630 or one or more third-party systems 670 via a network 610. The web server may include a mail server or other messaging functionality for receiving and routing messages between the social-networking system 660 and one or more client systems 630. An API-request server may allow a third-party system 670 to access information from the social-networking system 660 by calling one or more APIs. An action logger may be used to receive communications from a web server about a user's actions on or off the social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from a client system 630 responsive to a request received from a client system 630. Authorization servers may be used to enforce one or more privacy settings of the users of the social-networking system 660. A privacy setting of a user determines how particular information associated with a user can be shared. The authorization server may allow users to opt in to or opt out of having their actions logged by the social-networking system 660 or shared with other systems (e.g., a third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
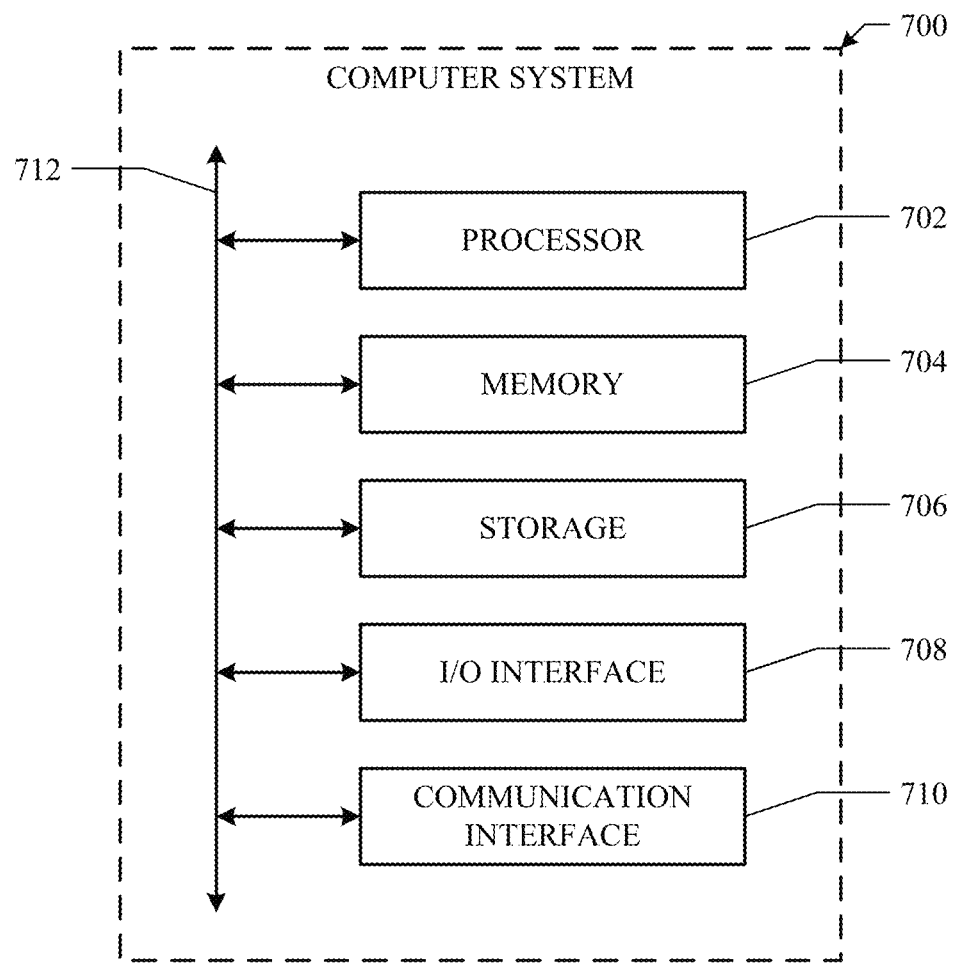
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   accessing first-resolution images corresponding to frames of a video;
   computing a motion vector based on a first-resolution image of a first frame in the video and a first-resolution image of a second frame in the video;
   generating a second-resolution warped image associated with the second frame by using the motion vector to warp a second-resolution reconstructed image associated with the first frame;
   up-sampling the first-resolution image of the second frame using an interpolation technique to generate an up-sampled second-resolution image associated with the second frame;
   computing adjustment parameters by processing the first-resolution image associated with the second frame and the second-resolution warped image associated with the second frame using a machine-learning model; and
   adjusting pixels of the up-sampled second-resolution image associated with the second frame based on the adjustment parameters to reconstruct a second-resolution reconstructed image associated with the second frame.

2. The method of claim 1, wherein differences between the second-resolution reconstructed image associated with the second frame and a second-resolution ground truth image associated with the second frame are measured during a training process of the machine-learning model.

3. The method of claim 2, wherein gradients of trainable variables of the machine-learning model are computed based on the measured differences between the second-resolution reconstructed image associated with the second frame and the second-resolution ground truth image associated with the second frame.

4. The method of claim 3, wherein the trainable variables are updated by a gradient-descent backpropagation procedure.

5. The method of claim 1, wherein the first frame locates before the second frame in a frame sequence of the video.

6. The method of claim 1, wherein differences between selected pixels in a second-resolution warped image associated with a third frame and the selected pixels in a second-resolution ground truth image associated with the third frame are measured during a training process of the machine-learning model.

7. The method of claim 6, wherein the second frame locates before the third frame in a frame sequence of the video.

8. The method of claim 7, wherein the selected pixels are identified as pixels with strong optical flow correspondence by comparing pixels in a warped second-resolution ground truth image associated with the second frame and a warped second-resolution ground truth image associated with the third frame.

9. The method of claim 7, wherein the second-resolution warped image associated with the third frame is generated by:
computing a second motion vector based on the second-resolution ground truth image associated with the second frame and the second-resolution ground truth image associated with the third frame; and
generating the second-resolution warped image associated with the third frame by using the second motion vector to warp the second-resolution reconstructed image associated with the second frame.

10. The method of claim 6, wherein gradients of trainable variables of the machine-learning model are computed based on the measured differences between the selected pixels in the second-resolution warped image associated with the third frame and the selected pixels in the second-resolution ground truth image associated with the third frame.

11. The method of claim 10, wherein the trainable variables are updated by a gradient-descent backpropagation procedure.

12. The method of claim 1, wherein a second resolution is higher than a first resolution.

13. The method of claim 12, wherein generating the up-sampled second-resolution image associated with the second frame comprises:
uniformly placing pixels of the first-resolution image of the second frame into a second-resolution image plane for the up-sampled second-resolution image such that a plurality of pixels left blank; and
filling the plurality of blank pixels in the second-resolution image plane with interpolated values of non-blank neighboring pixels.

14. The method of claim 1, wherein the second-resolution warped image associated with the second frame comprises objects located at predicted locations based on the computed motion vector.

15. One or more computer-readable non-transitory storage media embodying software that is operable when executed to:
access first-resolution images corresponding to frames of a video;
compute a motion vector based on a first-resolution image of a first frame in the video and a first-resolution image of a second frame in the video;
generate a second-resolution warped image associated with the second frame by using the motion vector to warp a second-resolution reconstructed image associated with the first frame;
up-sample the first-resolution image of the second frame using an interpolation technique to generate an up-sampled second-resolution image associated with the second frame;
compute adjustment parameters by processing the first-resolution image associated with the second frame and the second-resolution warped image associated with the second frame using a machine-learning model; and
adjust pixels of the up-sampled second-resolution image associated with the second frame based on the adjustment parameters to reconstruct a second-resolution reconstructed image associated with the second frame.

16. The media of claim 15, wherein differences between the second-resolution reconstructed image associated with the second frame and a second-resolution ground truth image associated with the second frame are measured during a training process of the machine-learning model.

17. The media of claim 16, wherein gradients of trainable variables of the machine-learning model are computed based on the measured differences between the second-resolution reconstructed image associated with the second frame and the second-resolution ground truth image associated with the second frame.

18. The media of claim 17, wherein the trainable variables are updated by a gradient-descent backpropagation procedure.

19. The media of claim 15, wherein the first frame locates before the second frame in a frame sequence of the video.

20. A system comprising: one or more processors; and a non-transitory memory coupled to the processors comprising instructions executable by the processors, the processors operable when executing the instructions to:
access first-resolution images corresponding to frames of a video;
compute a motion vector based on a first-resolution image of a first frame in the video and a first-resolution image of a second frame in the video;
generate a second-resolution warped image associated with the second frame by using the motion vector to warp a second-resolution reconstructed image associated with the first frame;
up-sample the first-resolution image of the second frame using an interpolation technique to generate an up-sampled second-resolution image associated with the second frame;
compute adjustment parameters by processing the first-resolution image associated with the second frame and the second-resolution warped image associated with the second frame using a machine-learning model; and
adjust pixels of the up-sampled second-resolution image associated with the second frame based on the adjustment parameters to reconstruct a second-resolution reconstructed image associated with the second frame.

* * * * *